(12) United States Patent
Chen et al.

(10) Patent No.: US 10,328,812 B2
(45) Date of Patent: Jun. 25, 2019

(54) POWER SUPPLY SYSTEM FOR VEHICLE CONTROL UNIT AND METHOD THEREOF

(71) Applicant: PHIHONG TECHNOLOGY CO., LTD., Taoyuan (TW)

(72) Inventors: Chun-Chen Chen, Taoyuan (TW); Jian-Hsieng Lee, Tainan (TW); Ying-Chieh Yeh, Tainan (TW); Hsiao-Tung Ku, Taoyuan (TW)

(73) Assignee: Phihong Technology Co., Ltd., Gueishan District, Taoyuan (TW)

( * ) Notice: Subject to any disclaimer, the term of this patent is extended or adjusted under 35 U.S.C. 154(b) by 223 days.

(21) Appl. No.: 15/386,384

(22) Filed: Dec. 21, 2016

(65) Prior Publication Data

US 2018/0022225 A1 Jan. 25, 2018

(30) Foreign Application Priority Data

Jul. 22, 2016 (CN) .......................... 2016 1 0581620

(51) Int. Cl.
*B60L 53/31* (2019.01)
*G06F 3/147* (2006.01)
(Continued)

(52) U.S. Cl.
CPC ............. *B60L 11/1825* (2013.01); *B60L 1/00* (2013.01); *B60L 3/0046* (2013.01);
(Continued)

(58) Field of Classification Search
CPC .. B60L 11/18; B60L 11/1805; B60L 11/1818; B60L 11/1825; B60L 11/1838;
(Continued)

(56) References Cited

U.S. PATENT DOCUMENTS 3,626,254 A * 12/1971 Kawakubo .......... F16H 61/0213
361/187
8,749,091 B2 * 6/2014 Skarani ................... G06F 1/263
307/10.1
(Continued)

*Primary Examiner* — Fritz M Fleming
*Assistant Examiner* — Jagdeep S Dhillon
(74) *Attorney, Agent, or Firm* — Muncy, Geissler, Olds & Lowe, P.C.

(57) ABSTRACT

A power supply system with automatic switchover voltage for vehicle control unit is proposed. The system comprises a supply communication module configured to communicate with a vehicle control unit, the supply communication module comprising a power supply module to provide power for a vehicle control unit; and a communication device coupled to the supply communication module for showing power supply status; wherein the supply communication module provides a first direct voltage and communicates with the vehicle control unit before supplying power, and if the supply communication module does not receive any message from the vehicle control unit within a first time interval, the supply communication module automatically switches to a second direct voltage from the first direct voltage or automatically increases the first direct voltage within a second time interval, and supplies power to the vehicle control unit; and wherein the second direct voltage is greater than the first direct voltage.

10 Claims, 5 Drawing Sheets

(51) Int. Cl.
*B60L 11/18* (2006.01)
*B60L 1/00* (2006.01)
*B60L 3/00* (2019.01)
*B60L 3/04* (2006.01)
*B60L 3/12* (2006.01)
*H02J 7/00* (2006.01)
*H02J 9/06* (2006.01)
*H02M 1/10* (2006.01)

(52) U.S. Cl.
CPC ............... *B60L 3/0084* (2013.01); *B60L 3/04* (2013.01); *B60L 3/12* (2013.01); *B60L 11/1838* (2013.01); *B60L 11/1846* (2013.01); *B60L 53/31* (2019.02); *G06F 3/147* (2013.01); *H02J 7/007* (2013.01); *H02J 7/0027* (2013.01); *H02J 9/06* (2013.01); *B60L 2230/16* (2013.01); *B60L 2240/547* (2013.01); *B60L 2240/549* (2013.01); *B60L 2250/12* (2013.01); *B60Y 2200/91* (2013.01); *B60Y 2200/92* (2013.01); *H02J 2007/0096* (2013.01); *H02M 1/10* (2013.01); *Y02T 10/7005* (2013.01); *Y02T 10/7055* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ... B60L 11/1846; B60L 3/0046; B60L 3/0084
USPC ...... 307/10.1, 9.1, 10.2, 10.6, 66, 64, 43, 38
See application file for complete search history.

(56) References Cited

U.S. PATENT DOCUMENTS

| | | | |
|---|---|---|---|
| 2014/0265560 A1* | 9/2014 | Leehey | B60L 1/003 307/10.1 |
| 2014/0309864 A1* | 10/2014 | Ricci | H04W 4/21 701/36 |
| 2015/0061387 A1* | 3/2015 | Daniel | H02S 50/00 307/24 |
| 2016/0101704 A1* | 4/2016 | McCalmont | B60L 11/1809 320/101 |
| 2017/0355268 A1* | 12/2017 | Roberts | B60K 6/48 |
| 2018/0126861 A1* | 5/2018 | Dorndorfer | B60L 11/1818 |

* cited by examiner

POWER SUPPLY SYSTEM FOR VEHICLE CONTROL UNIT AND METHOD THEREOF

TECHNICAL FIELD

The present invention relates to a power supply system for electric vehicles, and more particularly, to a power supply system with automatic switchover voltage for vehicle control unit and the method thereof.

BACKGROUND

In recent years, automobile driving population has greatly increased. The speedway progress of technology enabled the automobile companies to thrive. People become to think highly of the improvement of automobile performance as well as the source of energy. Since there is a high demand for clean energy, electric vehicles (EV) gain access to markets. Thereafter, electric vehicles have become popular due to social development and national policy promotion.

Various kinds of electric vehicles have been produced, after the creation of electronic vehicle systems, which utilize new intelligence techniques, providing user customization of traffic control environment system, such as driving environments, traffic conditions, intelligent driving and also charging system. For example, new types of electric automobiles are all equipped with Vehicle Control Unit (VCU), also known as Vehicle Control System or Vehicle Integrated Unit. Vehicle Control Unit enables the users to give commands under different control circumstances, featured in safety protection function and complete controlled area network (CAN) interface for signals integration among systems. Automobile application system has become indispensable that not only elevates road safety, but also makes electric vehicles become a trend.

Current voltage of power supply for VCU of electric vehicles is recognized as Accessory Power Supply (APS), generally divided into two power-supplies, 12V and 24V. Small-sized automobiles apply 12V, such as passenger vehicles and trucks. Large-sized automobiles apply 24V, such as large motor vehicles, large trucks or buses. Thus, both standards of direct-current (DC) motors of power supplies should be equipped at charging station with VCU.

When charging automobiles of 24V APS with 12V power supply, the operating voltage of 12V cannot meet the demands of 24V APS of VCU which results in malfunctioning of instrument panel, battery management system (BMS) or insulation tester during power supply and vice versa. The power supply machines should be manufactured respectively for 12V and 24V auxiliary power of automobiles. Even it is modified to make 12V and 24V power supply wires compatible, the complexity of circuits will accelerate the depletion of circuit components.

Moreover, drivers or users of electric vehicles tend to be unknown or forgetful about their EVs' voltage power supply for VCU and also confused about power supply process of VCU. As a result, even though they arrive at charging station, they make it difficult to decide the charging voltage for VCU. If the VCU will be provided in a variety, the charging system of electric vehicles will bring forth more problems in that it is much more difficult for the users to decide and memorize the suitable voltage power supply.

SUMMARY OF THE INVENTION

In summary, it still lacks a system or a method to automatically switch over voltages supply of VCU. Therefore, the purpose of this invention is to provide a power supply system with automatic switchover voltage for vehicle control unit used for improving conventional supply system applied to various VCU voltage standards, which is easy to be mistaken by users. In this invention, using the communication method, the connection with electric vehicle's VCU is first established. Via the supply communication module, a small voltage, for example, 12V, will be provided for VCU. Then, the supply process is monitored based on the messages received from VCU. If no message is received, a greater voltage, for example, 24V, will be provided. In this invention, a power supply system for vehicle control unit complied with automatic switchover voltage method achieves stable supply, simplifies supply process, and determines proper voltage supply of VCU for electric vehicles.

In a first aspect of the invention, a power supply system with automatic switchover voltage for vehicle control unit is proposed. The system comprises a supply communication module configured to communicate with a vehicle control unit of a mobile vehicle, the supply communication module comprising a power supply module to provide power for the vehicle control unit of the mobile vehicle, and a communication device coupled to the supply communication module for showing power supply status, wherein the supply communication module provides a first direct voltage and communicates with the vehicle control unit of the mobile vehicle before supplying power, and if the supply communication module does not receive any message from the vehicle control unit of the mobile vehicle within a first time interval, the supply communication module automatically switches to a second direct voltage from the first direct voltage or automatically increases the first direct voltage within a second time interval, and supplies power to the vehicle control unit, and wherein the second direct voltage is greater than the first direct voltage.

In this invention, another purpose is to provide a power supply method with automatic switchover voltage for vehicle control unit used to improve conventional supply system applied to various VCU voltage standards, which is easy to be mistaken by users. In this invention, the connection with electric vehicle's VCU is first established. Via the supply communication module, a small voltage, for example, 12V, will be provided for VCU. Then, the supply process is monitored based on the messages received from VCU. If no message is received, a greater voltage, for example, 24V, will be provided. In this invention, a power supply system for vehicle control unit complied with automatic switchover voltage method achieves stable supply, simplifies supply process, and determines proper voltage supply of VCU for electric vehicles.

In a second aspect of the invention, a power supply method with automatic switchover voltage for vehicle control unit comprising is proposed. The method comprises first providing a first direct voltage for a vehicle control unit of a mobile vehicle by a supply communication module, and communicating with the vehicle control unit of the mobile vehicle and confirming whether the power supply functions regularly by the supply communication module, wherein if the supply communication module does not receive any message from the vehicle control unit of the mobile vehicle within a first time interval, the supply communication module automatically switches to a second direct voltage from the first direct voltage, and wherein the second direct voltage is greater than the first direct voltage.

According to one aspect, the communication device further comprises a panel for showing the power supply status and for manually selecting supply voltages of the vehicle control unit.

According to one aspect, the first direct voltage is 12V, and the second direct voltage is 24V.

According to one aspect, the communication between the supply communication module and the vehicle control unit is applied to GB national standard and controlled area network (CAN).

According to one aspect, if the supply communication module does not receive any message from the vehicle control unit of the mobile vehicle within a first time interval, the supply communication module automatically switches to a second direct voltage from the first direct voltage or automatically increases the first direct voltage within a second time interval, and supplies power to the vehicle control unit.

According to one aspect, wherein the power supply method comprises automatically increasing the first direct voltage and supplying power to confirm a power demand of the mobile vehicle.

BRIEF DESCRIPTION OF THE DRAWINGS

The components, characteristics and advantages of the present invention may be understood by the detailed descriptions of the preferred embodiments outlined in the specification and the drawings attached. Embodiments of the invention are illustrated by way of examples, and not by way of limitation, in the figures of the accompanying drawings in which like reference numerals refer to similar elements.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention is applied to electric vehicles but not limited. The power supply system with automatic switchover voltage for vehicle control unit (called power supply system hereinafter) can be applied to other mobile vehicles such as automobiles or hybrid electric vehicles.

Figure 1:
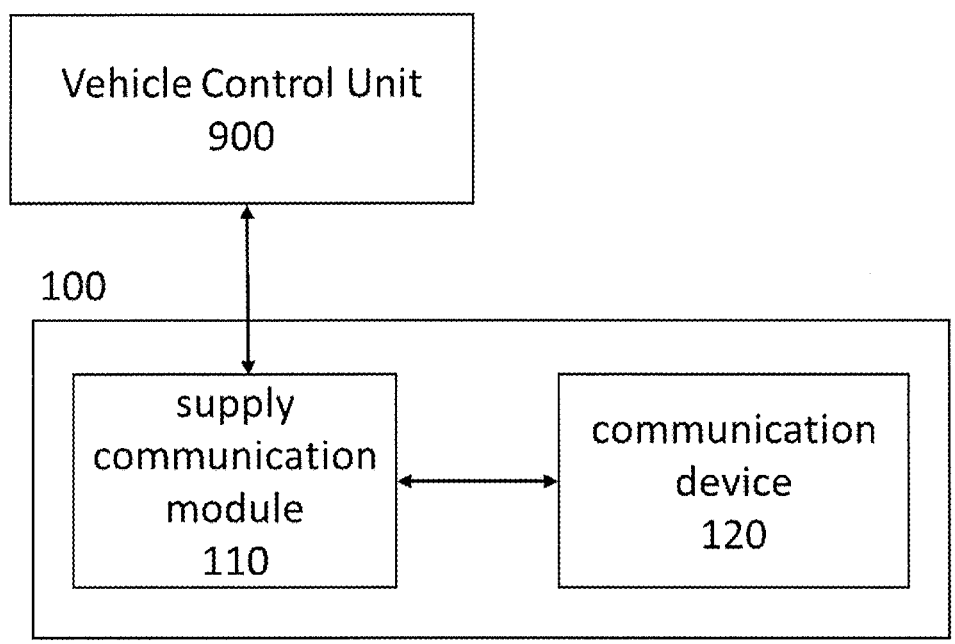
FIG. 1 shows an example of a power supply system with automatic switchover voltage for vehicle control unit according to an embodiment of the invention.

FIG. 1 shows an example of a power supply system with automatic switchover voltage for vehicle control unit according to an embodiment of the invention. A power supply system 100 comprises a supply communication module 110 configured to communicate with a vehicle control unit 900 of a mobile vehicle and a communication device 120 coupled to the supply communication module 110 for showing a power supply status, wherein the supply communication module first provides a first direct voltage and communicates with the vehicle control unit 900 of the mobile vehicle before supplying power, and if the supply communication module 110 does not receive any message from the vehicle control unit 900 of the mobile vehicle within a first time interval, the supply communication module 110 automatically switches to a second direct voltage from the first direct voltage or automatically increases the first direct voltage within a second time interval, and supplies power to the vehicle control unit 900. It should be noted that the power voltage used in the vehicle control unit (VCU) or vehicle control system herein is referred to auxiliary power or auxiliary power voltage.

Referring to FIG. 1, in one embodiment, the supply communication module 110 can be a microprocessor or other high order process system which may monitor the charging information between mobile vehicles and the charging station the supply communication module 110 can communicate with the vehicle control unit 900 of the mobile vehicle via various methods, and the communication methods includes: wire communication line, 2G network, 3G network, wireless network, but not to be limited; however, the communication method further includes other conventional communication methods which achieves communication, monitor, detection, protection, and all details in human-computer communication under the direct supply of national standards.

Referring to FIG. 1, in one embodiment, the communication methods mentioned above can be used to communicate with electric vehicles and the power, touch panel or cloud background corresponding to electric vehicles to record all the information between power supply module and electric vehicles and errors, and thereby providing this information for vehicle companies for further analysis after connecting to background cloud. Moreover, it is able to preset charging and time period, charging money and programming updates and so on.

Referring to FIG. 1, in one embodiment, both communication device 120 and the supply communication module 110 are capable of showing the power supply status. The communication device 120 can communicate with the vehicle control unit 900 of the mobile vehicle via various methods, and the communication methods includes: wire communication line, 2G network, 3G network, wireless network and other conventional communication methods. It should be noted that not only setting in the supply station but communication device 120 can be extended to other communication devices, such as common mobile devices, smart portable devices or cloud server with function for communication via connection links or network. When the supply communication module 110 connects to the vehicle control unit 900 of the mobile vehicle, the communication device 120 is capable of acquiring and presenting information about electric vehicles, power, touch panel and cloud background via the supply communication module 110.

Figure 2:
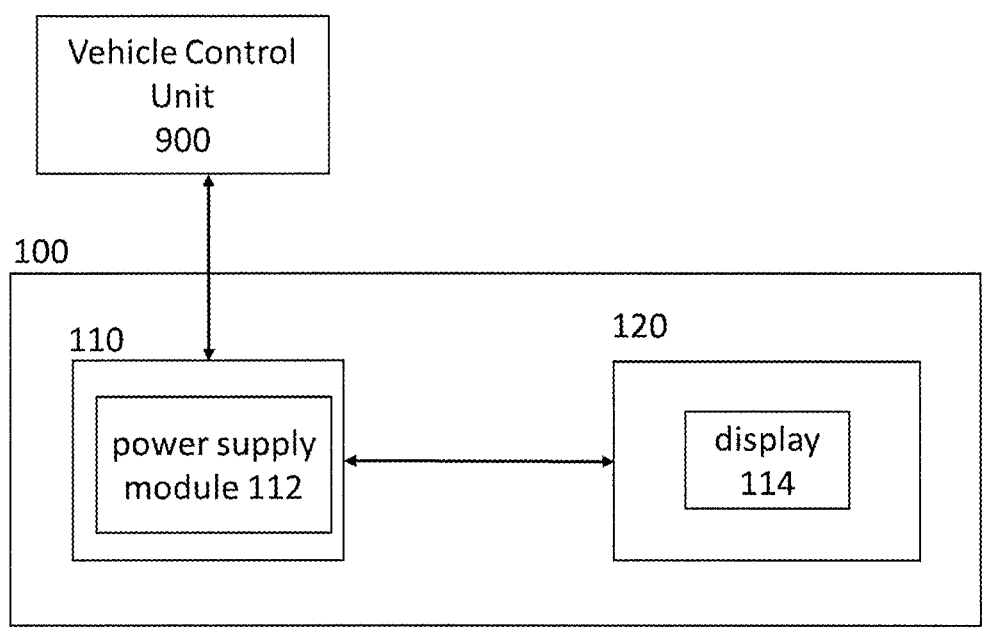
FIG. 2 shows an example of a power supply system with automatic switchover voltage for vehicle control unit according to an embodiment of the invention.

FIG. 2 shows an example of a power supply system with automatic switchover voltage for vehicle control unit according to an embodiment of the invention. In one embodiment, the supply communication module 110 comprises a power supply module 112 to provide power for the vehicle control unit 900 of the mobile vehicle. In addition, this power supply module 112 may output different direct voltage, for example, 12V, 24V, or 36V, but not limited to, other direct voltages can be offered according to specification of vehicle control unit in market.

Referring to FIG. 2, in one embodiment, the communication device 120 further includes a monitor or a display 114. Here the monitor 114 could be common displays, liquid crystal displays, touch screens, and, alternatively, the additional displays connected through network or connection line, for example, the display of mobile devices connected by connection line or the mobile devices' display connected by network. After the communication between communication device 120 and the vehicle control unit 900 of the mobile vehicle is established via the supply communication module 110, the display 114 can be used to show the power supply status and the type of supply power which the mobile vehicle applied to so that these messages may be offered to users or drivers. In addition, the users or drivers may manually select the supply voltages for their mobile vehicles by the display 114 or the communication device 120.

Referring to FIG. 1 or FIG. 2, it is noted that both supply communication module 110 and mobile vehicle control unit 900, are applied to GB national standard and controlled area network (CAN) (GB/T27930-2011), the network protocol between electric automobiles off-board electric power supply and battery management systems.

Figure 3:
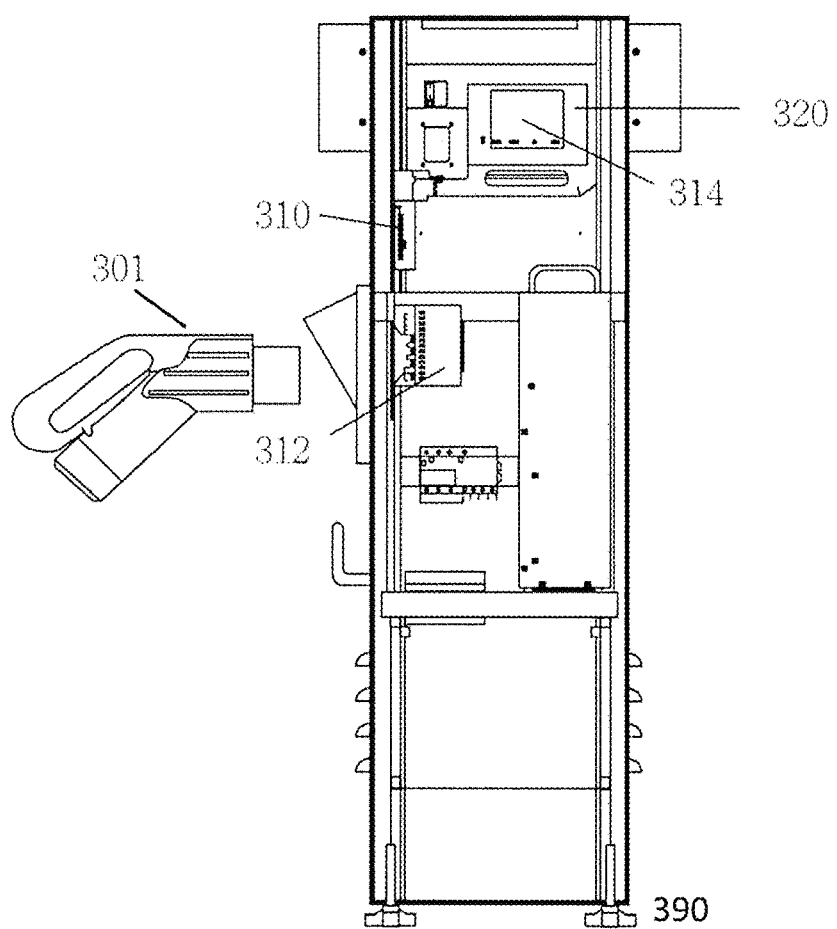
FIG. 3 shows an example of a power supply system with automatic switchover voltage for vehicle control unit in the power station according to an embodiment of the invention.
Figure 4:
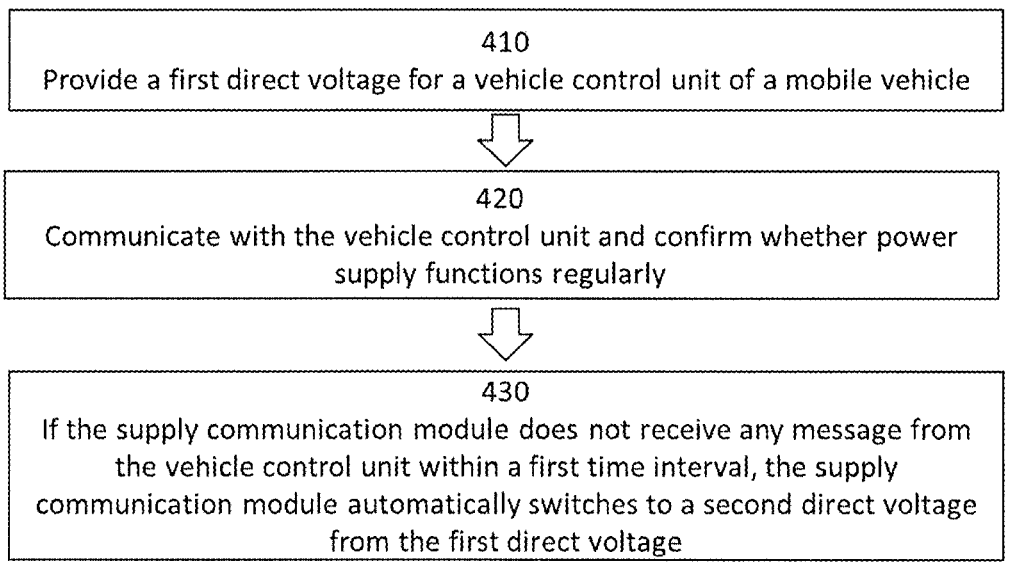
FIG. 4 shows an example of a power supply method with automatic switchover voltage for vehicle control unit according to an embodiment of the invention.

FIG. 4 shows an example of a power supply method with automatic switchover voltage for vehicle control unit according to an embodiment of the invention, corresponding to power supply system with automatic switchover voltage for vehicle control unit in FIG. 1 and FIG. 2, and FIG. 3 shows an example of a power supply system with automatic switchover voltage for vehicle control unit in the power station according to an embodiment of the invention. Explicit explanations of automatic switching voltage of vehicle control unit's power supply method 410-430 are provided as bellows.

As shown in a step 410, and referring to FIG. 3, in one embodiment, first driver or user will connect charging plug 301 with mobile vehicles. Supply communication module 310 comprises power supply module 312 to provide direct voltage power for the vehicle control unit 900 of the mobile vehicles. It is worth to be mentioned that the power supply module 312 has ail kinds of direct voltage output, including but not limited to 12V, 24V or 36V and can provide a corresponding direct voltage power for vehicle control unit 900 in the market. Supply communication module 310 provides first direct voltage power for the vehicle control unit 900. In one embodiment, the first direct voltage of voltage power is 12V.

As shown in a step 420 and referring to FIG. 3, in one embodiment, vehicle control unit 900 of mobile device will connect with supply communication module of charging station 390 or charging column 390. Supply communication module 310, as a micro-processing or higher-status processing system, can monitor mobile vehicles and charging information of the charging column. Supply communication module 310 can communicate with vehicle control unit 900 of mobile vehicles through various means, including telecommunication cables, 2G network, 3G network and wireless fidelity (WIFI). It is worth noted that other communication methods are known to be used, which realize national standards about all communications, monitors, measures, protection and human-computer interaction and communicates with electric vehicles, power, touch monitors and cloud background, recoding all information and defaults among power supply module and electric vehicles. Moreover, it is able to preset charging and time period, charging money and programming updates and so on.

As shown in a step 420 and referring to FIG. 3, both communication devices 320 and the supply communication module 310 are capable of showing the power supply status. The communication device 320 can communicate with the vehicle control unit 900 of the mobile vehicle via various methods, and the communication methods includes: wire communication line, 2G network, 3G network, wireless network and other conventional communication methods. It should be noted that not only setting in the supply station but communication device 320 can be extended to other communication devices such as common mobile devices, smart portable devices or cloudserver with function for communication via connection links or network. When the supply communication module 310 connects to the vehicle control unit 900 of the mobile vehicle, the communication device 320 is capable of acquiring and presenting information about electric vehicles, power, touch panel and cloud background via the supply communication module 310. On the other hand, under the communication, supply communication module 310 will receive the supply information, battery information for monitoring the working environments.

As shown in a step 420 and referring to FIG. 3, in one embodiment, the communication device 320 further includes a monitor or a display 314. Here the monitor 314 could be common displays, liquid crystal displays, touch screens, and, alternatively, the additional displays connected through network or connection line, for example, the display of mobile devices connected by connection line or the mobile devices' display connected by network. After the communication between communication device 320 and the vehicle control unit 900 of the mobile vehicle is established via the supply communication module 310, the display 314 can be used to show the power supply status and the type of supply power which the mobile vehicle applied so that these messages may be offered to users or drivers. In addition, the users or drivers may manually select the supply voltages such as 12V or 24V for their mobile vehicles by the display 314 or the communication device 320.

As shown in a step 430, and referring to FIG. 3, in one embodiment, if the supply communication module 310 does not receive any message from the vehicle control unit 900 of the mobile vehicle within a first time interval, the supply communication module 310 automatically switches to a second direct voltage from the first direct voltage for power supplying. For example, the first time interval could be one second. If no message is received within one second, the supply communication module 310 automatically switches to a second direct voltage from the first direct voltage for power supplying. In one embodiment, the first voltage is 12V and the second voltage is 24V. The first time interval hereof can be configured by the system user, for example, the first time interval can be set as 5 seconds. It is noted that both supply communication module 310 and mobile vehicle control unit 900, are applied to GB national standard and controlled area network (CAN) (GB/T27930-2011), the network protocol between electric automobiles off-board electric power supply and battery management systems.

Figure 5:
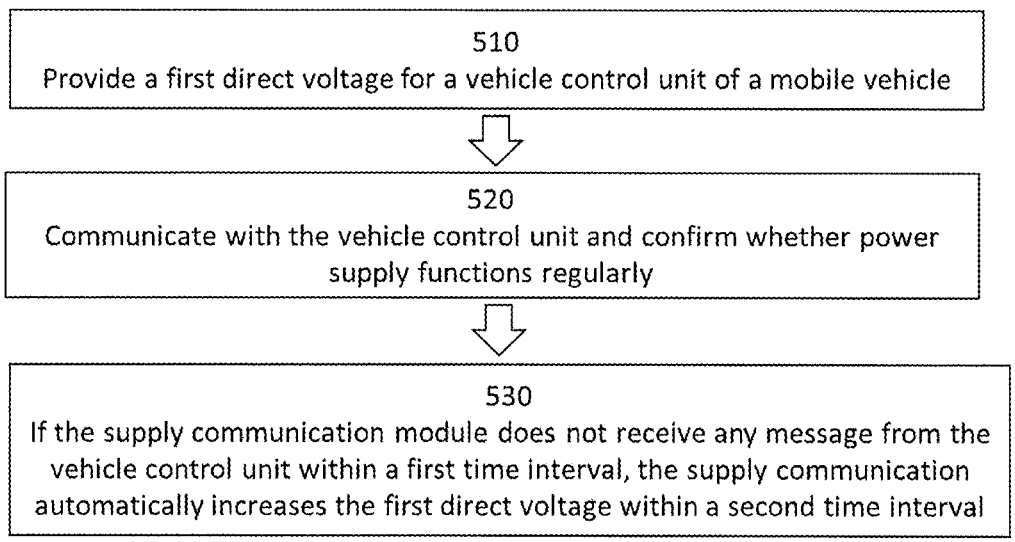
FIG. 5 shows an example of a power supply method with automatic switchover voltage for vehicle control unit according to an embodiment of the invention.

FIG. 5 shows an example of a power supply method with automatic switchover voltage for vehicle control unit according to an embodiment of the invention, corresponding to power supply system with automatic switchover voltage for vehicle control unit in FIG. 1 and FIG. 2, and FIG. 3 shows an example of a power supply system with automatic switchover voltage for vehicle control unit in the power station according to an embodiment of the invention.

Explicit explanations of automatic switching voltage of vehicle control unit's power supply method 510-530 are provided as follows.

As shown in a step 510, and referring to FIG. 3, in one embodiment, first driver or user will connect charging plug 301 with mobile vehicles. Supply communication module 310 comprises power supply module 312 to provide direct voltage power for the vehicle control unit 900 of the mobile vehicles. It is worth mentioned that the power supply module 312 has all kinds of direct voltage output, including but not limited to 12V, 24V or 36V and can provide corresponding direct voltage power for vehicle control unit 900 in the market. Supply communication module 310 provides first direct voltage power for the vehicle control unit 900. In one embodiment, the first direct voltage of voltage power is 12V.

As shown in a step 520, and referring to FIG. 3, in one embodiment, vehicle control unit 900 of mobile device will connect with supply communication module of charging station 390 or charging column 390. Supply communication module 310, as a micro-processing or higher-status processing system, can monitor mobile vehicles and charging information of the charging column. Supply communication module 310 can communicate with vehicle control unit 900 of mobile vehicles through various means, including telecommunication cables, 2G network, 3G network and wireless fidelity (WIFI). It is worth noted that other communication methods are known to be used, which realize national standards about all communications, monitors, measures, protection and human-computer interaction and communicates with electric vehicles, power, touch monitors and cloud background, recoding all information and defaults among power supply module and electric vehicles. Moreover, it is able to preset charging and time period, charging money and programming updates and so on.

As shown in a step 520 and referring to FIG. 3, both communication devices 320 and the supply communication module 310 are capable of showing the power supply status. The communication device 320 can communicate with the vehicle control unit 900 of the mobile vehicle via various methods, and the communication methods includes: wire communication line, 2G network, 3G network, wireless network and other conventional communication methods. It should be noted that not only setting in the supply station but communication device 320 can be extended to other communication devices such as common mobile devices, smart portable devices or cloud server with function for communication via connection links or network. When the supply communication module 310 connects to the vehicle control unit 900 of the mobile vehicle, the communication device 320 is capable of acquiring and presenting information about electric vehicles, power, touch panel and cloud background via the supply communication module 310. On the other hand, under the communication, supply communication module 310 will receive the supply information, battery information for monitoring the working environments.

As shown in a step 520 and referring to FIG. 3, in one embodiment, the communication device 320 further includes a monitor or a display 314. Here the monitor 314 could be common displays, liquid crystal displays, touch screens, and, alternatively, the additional displays connected through network or connection line, for example, the display of mobile devices connected by connection line or the mobile devices' display connected by network. After the communication between communication device 320 and the vehicle control unit 900 of the mobile vehicle is established via the supply communication module 310, the display 314 can be used to show the power supply status and the type of supply power which the mobile vehicle applied so that these messages may be offered to users or drivers. In addition, the users or drivers may manually select the supply voltages such as 12V or 24V for their mobile vehicles by the display 314 or the communication device 320.

As shown in a step 530 and referring to FIG. 3, in one embodiment, if the supply communication module 310 does not receive any message from the vehicle control unit 900 of the mobile vehicle within a first time interval, the supply communication module 310 is configured to automatically switch to a second direct voltage from the first direct voltage for power supplying or increase me first direct voltage within a second time interval for power supplying. For example, the first time interval could be one second. If no message is received within one second, the supply communication module 310 automatically switches to a second direct voltage from the first direct voltage for power supply. In one embodiment, the first direct voltage is 12V and the second direct voltage is 24V. The first time interval hereof can be configured by the system user, for example, the first time interval can be set as 5 seconds. Alternatively, it should be noted that, as the time interval which voltage increased within a specific time interval via supply communication module 310, the second time interval is adjustable by equipment manufacturers or users. For example, the second time interval can be set as 1 second that the first voltage (12V) is increased to the second voltage. (24V) Moreover, the second time interval hereof can be configured by the system user. In one embodiment, by this method, the power used and the power supply functioned in the VCU can be confirmed through supply communication module 310.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not limited to this embodiment, but rather it is intended to cover various modifications and similar arrangements included within the spirit and scope of the appended claims, the scope of which should be accorded with the broadest interpretation, thereby encompassing all such modifications and similar structures. While the preferred embodiment of the invention has been illustrated, it will be appreciated that various changes can be made without departing from the spirit and scope of the invention.

What is claimed is:

1. A power supply system with automatic switchover voltage for vehicle control unit at least comprising:
    a supply communication module configured to communicate with a vehicle control unit of a mobile vehicle, said supply communication module comprising a power supply module to provide power for said vehicle control unit of said mobile vehicle;
    a communication device coupled to said supply communication module for showing power supply status;
    a preset charging module coupled to said supply communication module to preset a time point for said power supply module to start to charge said vehicle control unit of said mobile vehicle;
    a supply time setting module coupled to said supply communication module to set a time period for said power supply module to charge said vehicle control unit of said mobile vehicle; and
    a charging money setting module coupled to said supply communication module to set an amount of money for said power supply module to charge said vehicle control unit of said mobile vehicle;
    wherein said supply communication module provides a first direct voltage and communicates with said vehicle control unit of said mobile vehicle before supplying power, and if said supply communication module does not receive any message from said vehicle control unit of said mobile vehicle within a first time interval, said supply communication module automatically switches to a second direct voltage from said first direct voltage or automatically increases said first direct voltage within a second time interval, and supplies power to said vehicle control unit; and wherein said second direct voltage is greater than said first direct voltage.

2. The system of claim 1, wherein said communication device further comprises a panel for showing said power supply status and for manually selecting supply voltages of said vehicle control unit.

3. The device of claim 1, wherein said first direct voltage is 12V, and said second direct voltage is 24V.

4. The device of claim 1, wherein said communication between said supply communication module and said vehicle control unit is applied to GB national standard and controlled area network (CAN).

5. A power supply method with automatic switchover voltage for vehicle control unit comprising:
    providing a first direct voltage for a vehicle control unit of a mobile vehicle by a supply communication module, said supply communication module comprising a power supply module to provide power for said vehicle control unit of said mobile vehicle;
    communicating with said vehicle control unit of said mobile vehicle and confirming whether power supply functions regularly by said supply communication module;
    if said supply communication module does not receive any message from said vehicle control unit of said mobile vehicle within a first time interval, automatically switching to a second direct voltage from said first direct voltage by said supply communication module, and wherein said second direct voltage is greater than said first direct voltage;
    presetting a time point for said power supply module of said supply communication module to start to charge said vehicle control unit of said mobile vehicle;
    setting a time period for said power supply module to charge said vehicle control unit of said mobile vehicle; and
    setting an amount of money for said power supply module to charge said vehicle control unit of said mobile vehicle.

6. The method of claim 5, wherein if said supply communication module does not receive any message from said vehicle control unit of said mobile vehicle within a first time interval, said supply communication module automatically switches to a second direct voltage from said first direct voltage or automatically increases said first direct voltage within a second time interval, and supplies power to said vehicle control unit.

7. The method of claim 5, wherein said first direct voltage is 12V, and said second direct voltage is 24V.

8. The method of claim 5, wherein comprises using a communication device or a panel to show power supply status and manually select supply voltages of said vehicle control unit.

9. The method of claim 5, wherein said communication between said supply communication module and said vehicle control unit is applied to GB national standard and controlled area network (CAN).

10. The method of claim 6, wherein comprises automatically increasing said first direct voltage and supplying power to confirm a power demand of said mobile vehicle.

* * * * *